Jan. 6, 1970    T. L. SEABORNE    3,487,809
MILK FLOW INDICATOR FOR MILKING MACHINES
Filed Nov. 9, 1967

Inventor:
Thomas Leslie Seaborne
by Michael S. Striker,
Attorney

United States Patent Office 3,487,809
Patented Jan. 6, 1970

3,487,809
MILK FLOW INDICATOR FOR MILKING MACHINES
Thomas Leslie Seaborne, corner of Lygon St. and Brunswick Road, East Brunswick, Victoria, Australia
Filed Nov. 9, 1967, Ser. No. 681,839
Int. Cl. G01f 15/06
U.S. Cl. 116—117
10 Claims

ABSTRACT OF THE DISCLOSURE

A milk flow indicator for milking machines, wherein a cap is lifted and rotated by inflowing milk to bear against a transparent bowl and to produce an audible signal which indicates that the rate of milk flow is within a desired range.

---

This invention relates to an improved milk flow indicator for use on milking machines between the teat cups and the milk line to indicate the end of milking.

Existing milk flow indicators rely on visual indication so that the attendant has to keep the indicator constantly in view.

The present invention provides an indicator which, in addition to giving a clear visual indication, gives an audible indication as well.

According to the invention, the improved milk flow indicator is characterized by having a bowl forming a bowl chamber, a milk flow pipe extending into the bowl chamber and a rotatable member provided at the end of the milk flow pipe and adapted to rise under the flow of milk into contact with the bowl and also be to rotated by the milk flow, the rotation of the member in contact with the bowl producing an audible indication that normal milking rate of flow is taking place.

The invention is more fully described aided by reference to the accompanying drawings which illustrate the preferred embodiment. In these drawings.

Figure 1:
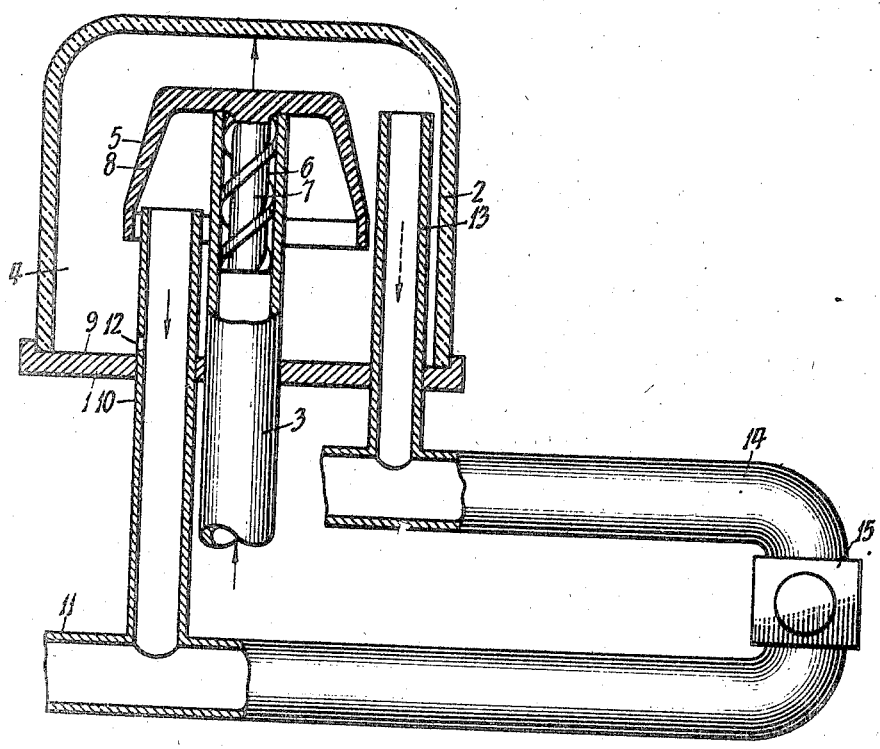
FIG. 1 is a vertical sectional view of the improved milk flow indicator in use.
Figure 2:
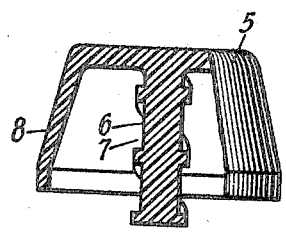
FIG. 2 is a detail view of the rotatable member.

As is shown in these views, the improved indicator comprises a base 1 supporting a glass or other transparent container or bowl 2. A milk admitting pipe 3 from the teat cups extends upwardly through the base 1 into the chamber formed by the bowl and is provided at its upper end wih a rotatable cap-like signal generating member 5. Said member has a downwardly extending stem or shank 6 slidably received in the upper end of the milk pipe 3 and said stem has a helical rib, flute, groove, passage or the like 7 through which the milk flows, the flow of milk acting on said helical flute or the like causing the cap-like member 5 to rotate on the upper end of the milk flow pipe.

The cap-like member 5 also has a downwardly extending cowl or flange 8 to direct the milk downwardly to the bottom portion 9 of the bowl chamber 4.

Extending upwardly into the bowl chamber 4, a distance approximately half the height of the bowl is a milk evacuating or outlet pipe 10 leading to the milk line, as 11, of the milking machine. Said outlet pipe preferably extends into the cap-like member 5 beneath the cowl or flange 8. The outlet pipe has a small bleed hole 12 adjacent to the floor 9 of the bowl chamber 4 to drain milk in the bottom of the bowl chamber beneath the upper end of the outlet pipe into said pipe. The size of the hole 12 is such that it will drain a predetermined amount of milk per minute, usually about ½ lb. of milk per minute which is the generally accepted rate for the end of milking.

In the use of the indicator, the milk flowing upwardly through the milk pipe 3 causes the cap-like member 5 to rise into contact with the top of the bowl 2 and also, by reason of the helical flute 7, causes said cap-like member to rotate. The rotation of the cap-like member in contact with the underside of the bowl produces an audible indication that the normal milking rate of flow is taking place. The milk also fills the bowl chamber 4 up to the level of the milk outlet pipe 10 simultaneously giving a clear visual indication of normal milking rate of flow.

The above continues until the rate of milk flows falls below say ½ lb. per minutes which normally represents the end of milking. The cap-like member 5 accordingly descends to its lowermost position and ceases to rotate. The audible indication thus ceases indicating the end of milking and simultaneously the bleed hole 12 overtakes the now small intake of milk into the bowl chamber 5 and drains the milk therefrom, the emptying of the bowl chamber also visually indicating the end of milking.

The bowl chamber 4 may also have an air pipe or conduit 13 extending from the upper portion of the bowl chamber above the milk level to the vacuum line 14 of the machine to exhaust air from the milk and reduce possibility of lipolysis of the butterfat. Provision may also be made for a non-return ball type valve in said air pipe for washing purposes.

With a milk flow indicator as described, it is possible to provide means such as an easily regulated valve as 15 for connecting the vacuum line 14 to the milk line 11 so that the pulsation in the vacuum line can be utilized under regulated control to feed the milk along the milk line to the releaser. This further reduces the possibility of air being forced into the milk in the milk line with risk of lipolysis.

The improved milk flow indicator, as described, will be found very effective in use and, as it gives audible indication of normal milking flow as well as visual indication, it will be of great advantage to the attendant who thus does not require to keep the indicator constantly in view as previously.

What is claimed is:

1. In a milking machine, a milk flow indicator, comprising a container defining a chamber, milk admitting means having an outlet arranged to discharge into said chamber an ascending stream of milk, a signal generating member located in said chamber in the path of the milk stream and having means effective to impart to said member rotary motion under the action of said stream, said member and said container having portions which engage each other to produce a continual audible signal when the rate of milk flow into the container exceeds a predetermined minimum rate which causes said member to rise to a predetermined position, and means for evacuating the milk from said chamber.

2. A milk flow indicator as defined in claim 1, wherein at least a portion of said container consists of light transmitting material and said means for evacuating the milk from said chamber comprises a pipe having an inlet which is observable through said light transmitting portion.

3. A milk flow indicator as defined in claim 2, wherein said container includes an upper and a bottom portion, said pipe extending through and beyond said bottom portion into said chamber and having at least one bleed hole in the region of said bottom portion to drain milk from said chamber beneath the level of said inlet upon termination of milk admission into said chamber.

4. A milk flow indicator as defined in claim 1, wherein said milk admitting means comprises a pipe having an upper end and said signal generating member is a cap having a downwardly extending stem slidably received in the upper end of said pipe, said means for effecting said rotary motion being provided on said stem.

5. A milk flow indicator as defined in claim 4, wherein said means for effecting said rotary motion comprises a helical surface along which the milk flows to rotate said cap.

6. A milk flow indicator as defined in claim 4, wherein said chamber has an upper portion and a bottom portion and said cap further includes a flange which directs the milk stream toward said bottom portion of said container.

7. A milk flow indicator as defined in claim 1, wherein said chamber has a bottom portion which collects inflowing milk and an upper portion and further comprising suction generating means having a conduit extending into the upper portion of said chamber.

8. A milk flow indicator as defined in claim 7, wherein said conduit is connected to said milk evacuating means.

9. A milk flow indicator as defined in claim 1, wherein said member has a flange which is located at a level above the inlet of said milk evacuating means.

10. A milk flow indicator as defined in claim 1, wherein said portion of said member has a top surface and said portion of said container has a bottom surface which is engaged by said top surface when the rate of milk flow exceeds said minimum rate.

References Cited
UNITED STATES PATENTS

| | | | |
|---|---|---|---|
| 148,026 | 3/1874 | Boyle | 73—210 |
| 1,264,214 | 4/1918 | Shippert | 116—117 |
| 1,459,420 | 6/1923 | Shippert | 116—117 XR |
| 1,756,491 | 4/1930 | Marsh | 116—117 |
| 2,293,473 | 8/1942 | Schlueter | 73—194 |

LOUIS J. CAPOZI, Primary Examiner

U.S. Cl. X.R.

73—194; 116—67; 119—14.16